Figure 1:
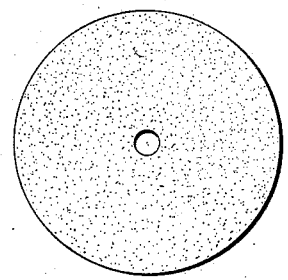
Figure 2:

A. O. MORGAN.
ARTIFICIAL GRINDSTONE.

No. 192,781. Patented July 3, 1877.

WITNESSES
Franck L. Ouraud
Frank Galt

INVENTOR
A. O. Morgan
Alexander Mason
ATTORNEYS

UNITED STATES PATENT OFFICE.

ALVAH O. MORGAN, OF BURLINGAME, KANSAS.

IMPROVEMENT IN ARTIFICIAL GRINDSTONES.

Specification forming part of Letters Patent No. 192,781, dated July 3, 1877; application filed February 26, 1877.

*To all whom it may concern:*

Be it known that I, ALVAH O. MORGAN, of Burlingame, in the county of Osage, and in the State of Kansas, have invented certain new and useful Improvements in the Manufacture of Whetstones, Grindstones, &c; and do hereby declare that the following is a full, clear, and exact description thereof.

The nature of my invention consists in the construction of grindstones and whetstones for various uses, of the materials and in the manner hereinafter set forth.

To enable others to make and practice my invention, I will proceed to give the ingredients of which it is composed and the manner in which they are compounded and prepared.

In some sections of the State of Kansas I find a clay composed of about eighty (80) per cent. of silica, the remainder being alumina, oxide of iron, lime, and magnesia.

This clay I remove from the earth, and after washing it thoroughly and straining it I mix with it sand.

The sand may be coarse or fine, ground or otherwise, according to the grade of stone I desire to make.

After the sand is thoroughly incorporated I mold the material and then burn it in a kiln. It is then ready for use.

Having thus fully described my invention, what I claim is—

A grindstone wheel or tool, composed of a native clay comprising the elements silica, alumina, oxide of iron, lime, and magnesia, and of sifted sand, as set forth.

In testimony that I claim the foregoing I have hereunto set my hand this 21st day of August, 1876.

ALVAH O. MORGAN.

Witnesses:
BENJ. F. BAKER,
S. H. NEWMAN.